United States Patent [19]

Feichtinger

[11] 4,095,903
[45] Jun. 20, 1978

[54] MEASURING APPARATUS
[75] Inventor: Kurt Feichtinger, Katzwalchen, Germany
[73] Assignee: Dr. Johannes Heidenhain GmbH, Traunreut, Germany
[21] Appl. No.: 777,116
[22] Filed: Mar. 14, 1977
[30] Foreign Application Priority Data
  Mar. 18, 1976  Germany ............... 2611459
[51] Int. Cl.² ........................... G01B 11/04
[52] U.S. Cl. .................. 356/169; 33/125 C; 250/237 G
[58] Field of Search .......... 33/125 C; 250/237 G; 356/169, 170, 172

[56] References Cited
U.S. PATENT DOCUMENTS

| Re. 29,281 | 6/1977 | Burns et al. | 356/169 |
| 3,138,714 | 6/1964 | Heidenhain | 356/169 |
| 3,816,003 | 6/1974 | Litke | 356/169 |
| 4,060,903 | 12/1977 | Ernst | 33/125 C |

Primary Examiner—John K. Corbin
Assistant Examiner—R. A. Rosenberger
Attorney, Agent, or Firm—Hume, Clement, Brinks, Willian & Olds, Ltd.

[57] ABSTRACT

A measuring apparatus for measuring or adjusting the relative position of two objects, including a measuring scale, and a reading unit for the measuring scale connected in a hinge-like manner by means of a coupling to an object whose relative position is to be measured and to auxiliary guide means. The coupling includes a lever pivotally attached to the measured object, and an arcuate coupling surface is attached to the reading unit, and a spring member which is preferably a pre-tensioned resilient wire bow embraces the lever and the reading unit in the area of the coupling surfaces in a bracket-like manner.

24 Claims, 4 Drawing Figures

MEASURING APPARATUS

BACKGROUND OF THE INVENTION

1. Field of the Invention

The invention relates to a measuring apparatus for measuring or adjusting the relative position between two objects, for example, the bed and the carriage of a processing or measuring machine. The measuring apparatus according to the invention includes a measuring scale, and a reading unit for the measuring scale which is connected in a hinge-like manner by means of a coupling to an object whose relative position is to be measured and to auxiliary guide means separated from the guide means for the measured object. The measured object can be a carriage of a processing or measuring machine. The reading unit can be a component of an optical, electrical, or photoelectrical longitudinal measuring apparatus.

2. Description of the Prior Art

In the prior art measuring apparatus are provided whereby the linear dimension of an object is optically measured by reciprocal movement of a measuring scale and reading unit, one of which is secured to the measured object. Optical longitudinal measuring apparatus of this type are broadly disclosed in West German Gebrauchsmuster No. 75 21 395 and U.S. Pat. No. 3,816,003 (Litke) issued June 11, 1974. These measuring apparatus typically include a reading unit which is guided along an auxiliary guide means mounted separately from a machine or measured object guide means, and additionally require an articulated coupling to the object to which the reading unit is connected. Such a coupling must be free from play to avoid any adverse effect upon the measuring precision of the apparatus. In the prior art couplings used in measuring apparatus of this type are costly and contain technical deficiencies which diminish measuring precision.

SUMMARY OF THE INVENTION

According to the present invention, a measuring apparatus is provided which overcomes the disadvantages of the prior art with respect to the couplings between a reading unit and a measured object. The measuring apparatus of the present invention includes a precision coupling which has the advantages of high rigidity, considerable transfer precision, ease of manufacture, and simplicity in mounting. Moreover, this coupling substantially eliminates measuring errors, typically caused either by a shift in the position of the reading unit perpendicular to a direction of measurement or a shift in the position of the measuring scale relative to a guide means for the measured object.

The present invention overcomes the disadvantages of the prior art by coupling two parts and maintaining these parts in proper relationship by a spring member. One coupling part is provided with an arcuate surface which contacts a planar surface of the opposite coupling part. The spring member acts upon the coupling parts to maintain the arcuate and planar coupling surfaces in contact, and additionally to urge the reading unit against auxiliary guides.

In a preferred embodiment of the present invention there is provided a coupling including a lever which is pivotably positioned at a pin attached to the measured object. The lever is provided with an arcuate surface which seats at a planar surface of the reading unit under the tension of a spring member. This spring member is preferably a pre-tensioned resilient wire bow which embraces the lever and the reading unit in the area of the coupling surfaces in a bracket-like manner.

Accordingly, the present invention provides an improved measuring apparatus wherein the coupling has the advantages of ease of fabrication and mounting, high rigidity, and resultant high transfer precision. Furthermore, the measuring apparatus is insensitive to parallel shifting of the instrument with respect to the scale, even during a measuring operation, and the apparatus has relatively high assembling tolerances resulting from a substantially diminished sensitivity regarding an oblique positioning of the measuring scale relative to the guide means of the object to be measured.

Other advantages, objects, and features of the present invention will become apparent upon reading the following detailed description of the preferred embodiment in conjunction with the accompanying drawings.

DESCRIPTION OF THE PREFERRED EMBODIMENT

The preferred embodiment illustrated shows an optical longitudinal measuring of the type disclosed in West German Gebrauchsmuster No. 75 21 395, incorporated by reference herein, including a coupling according to the present invention.

Figure 1:
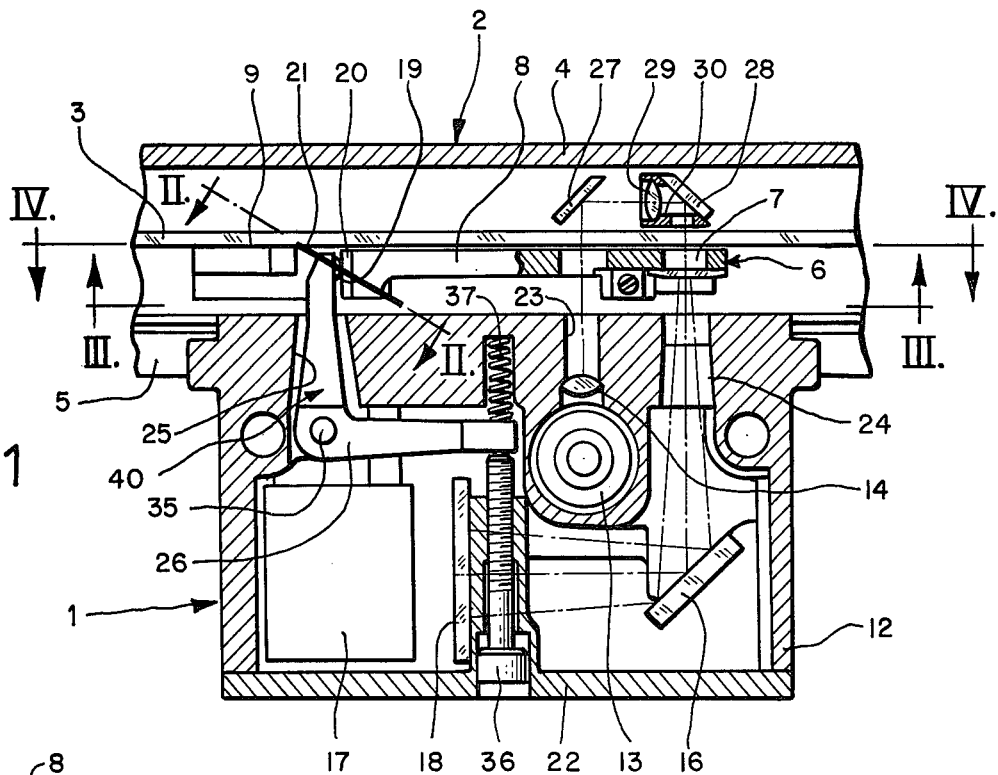
FIG. 1 is a cross-sectional view of an optical longitudinal measuring apparatus embodying the present invention.

Referring now to the drawings, and more particularly to FIG. 1, there is illustrated in cross-sectional view a measuring apparatus embodying to the present invention. The measuring apparatus includes an optical entrainment means 1 fastened to a machine tool bed (not shown), a reading unit 6 coupled to the entrainment means 1, and a housing 2 fastened to a machine tool carriage (not shown). Alternatively the entrainment means can be fastened to the machine tool carriage and the housing 2 can be fastened to the machine tool bed. The housing 2 includes a U-shaped, relatively rigid hollow body 4 and a glass scale 3 attached within the hollow body 4 preferably by an adhesive. The hollow body 4 is preferably constructed from metal, such as aluminum. The hollow body 4 is sealed by flexible sealing lips 5 designed in a rooflike manner and mounted to the hollow body 4, with a bladed portion of the entrainment means 1 extending through the sealing lips.

Figure 3:
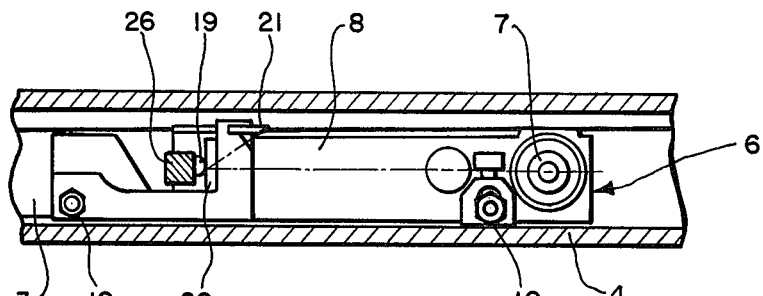
FIG. 3 is a cross-sectional view of the measuring apparatus of FIG. 1 taken along line III—III.
Figure 4:
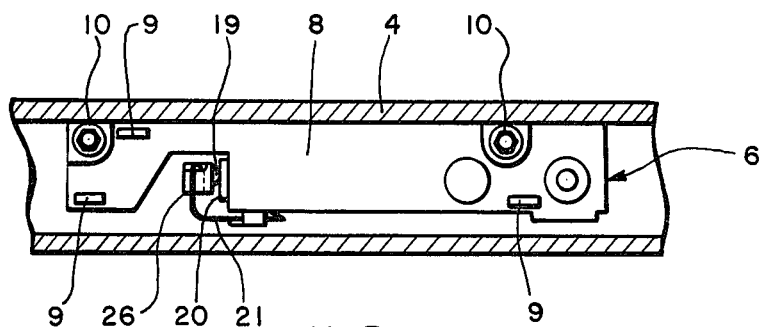
FIG. 4 is a cross-sectional view of the measuring apparatus of FIG. 1 taken along line IV—IV.

The reading unit 6 includes a supporting body 8 and an objective lens 7 fastened to the supporting body 8. The supporting body 8 is seated directly at the graduation surface of the scale 3 with low friction forces by means of sliding shoes 9, as illustrated in FIG. 4, preferably made of plastic. With this arrangement of the supporting body 8 and the scale 3 the relatively small effective operating distance between the objective lens 7 and the graduation surface of the scale 3, caused by the short focal length of the objective lens 7, can be held constant. As illustrated in FIGS. 3 and 4, roller bearings 10 are mounted at the supporting body 8 and contact with a guiding surface of the hollow body 4.

Figure 2:
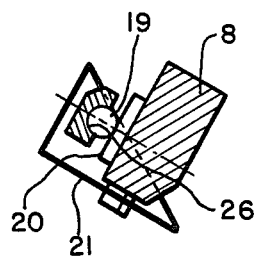
FIG. 2 is a cross-sectional view of the measuring apparatus of FIG. 1 taken along line II—II, and particularly illustrating a bracket-like wire bow of a coupling of the measuring apparatus.

The reading unit 6 is coupled in an articulated manner by means of a play-free coupling 40 to the entrainment means 1 which houses the optical system and moves with respect to the scale 3. As illustrated in FIG. 1 the coupling 40 between the reading unit 6 and the entrainment means 1 includes an angular lever 26 which is provided with a spherical surface 19 at one end, which acts as a first coupling part. The surface 19 is preferably the exposed surface of a steel ball inserted within a recess in the lever 26 as shown in FIGS. 2, 3, and 4. In the preferred embodiment the lever 26 is made from aluminum but any suitable material can be used. The spherical surface 19 seats on a planar surface 20 of the reading unit 6. The planar surface 20 acts as a second coupling part and is preferably provided by a metal rod, which can be affixed to the reading unit 6. The surfaces 19 and 20 provide the coupling surfaces for the reading unit 6 and entrainment means 1.

In order to maintain the surfaces 19 and 20 in contact with each other, there is provided according to the invention a spring member 21 which also urges the reading unit 6 against the guide surfaces of the scale 3 and the hollow body 4, thereby assuring perfect guiding of the reading unit 6 as it is moved during operation of the measuring apparatus. In the preferred embodiment illustrated, the spring member 21 is a pre-tensioned resilient wire bow which embraces the reading unit 6 and the lever 26 in a bracket-like manner in the area of the coupling surfaces 19 and 20.

As most clearly illustrated in FIG. 1, the spring member 21 is preferably a triangular wire bow obliquely mounted whereby a first force component acts in the direction of an auxiliary guide means formed by the graduation surface of the scale 3, a second force component acts in the direction of an auxiliary guide means represented by the hollow body 4, and ultimately a third force component acts at the coupling surfaces 19 and 20.

The angular lever 26 is pivotably positioned as shown in FIG. 1 by means of a play-free bearing 35. This arrangement permits the solid value adjustments customary in most longitudinal measuring systems. The angular lever 26 is adjusted with the aid of a screw 36 which operates against the expansive force of a spring 37. Upon actuation of the screw 36 the angular lever 26 is deflected outwardly and the supporting body is shifted slightly relative to the graduation scale 3 until a numerical graduation interval from which measurement is to be started is set at a reading index of the measuring apparatus.

The entrainment means 1 is provided with a bladed portion, having a sword-like cross-section, which is inserted into the sealing lips 5. The entrainment means 1 is designed as a housing 12 in the area protruding opposite the hollow body 4. An optical system including a lamp 13, a lens 14, reversing mirrors 16 and 17 and a frosted glass disc 18 are accommodated within the housing 12. The housing 12 is sealed by a cover 22, and has an aperture 23 for an illuminating light beam from the lamp 13 through the lens 14, and further includes an aperture 24 for an image light beam transmitted through objective lens 7, and an opening 25 to accommodate the angular lever 26. The direction of the illuminating light beam from the lamp 13 reversed on the side of the scale 3 opposite the lamp 13 by mirrors 27 and 28. The mirror 28 is fastened via a holding means (not shown) to the projecting edge of the housing 12. Together with the condenser 29 the mirror 28 is mounted to the supporting body 8 for the objective lens 7 via a holding means 30.

The improved measuring apparatus of the present invention provides the following advantages: a coupling which permits ease of fabrication and mounting, and has high rigidity, thereby producing high precision of transfer; insensitivity of the measuring apparatus to parallel shifts of the entrainment means relative to the scale, including those shifts encountered during measuring operations; and relatively high assembling tolerances, because the measuring apparatus shows only a slight sensitivity to an oblique positioning of the scale relative to the guide means of the measured object.

Though the embodiments hereinbefore described are preferred, many modifications and refinements which do not depart from the true spirit and scope of the invention may be conceived by those skilled in the art. It is intended that all such modifications be covered by the following claims.

I claim:

1. A measuring apparatus comprising:
an elongated hollow body;
a measuring scale attached within the hollow body;
a reading unit for the measuring scale; and
means for coupling the reading unit to a measured object in a hinge-like manner and for urging the reading unit against auxiliary guide surfaces;
said coupling means comprising a first coupling part provided with an arcuate surface, a second coupling part provided with a planar surface to contact the arcuate surface, and a spring member to maintain the first and second coupling parts in contact and to urge the reading units against the auxiliary guide surfaces.

2. The measuring apparatus of claim 1 wherein the reading unit is directly seated at the scale, and the scale and the hollow body provide the auxiliary guide surfaces for the reading unit.

3. The measuring apparatus of claim 2 wherein the entrainment means is provided with a bladed portion having a sword-like cross section which is inserted into sealing lips for the hollow body.

4. The measuring apparatus of claim 3 wherein the spring member urges the reading unit against the entrainment means and against guide surfaces of the scale and the hollow body.

5. The measuring apparatus of claim 4 wherein the reading unit is seated at the guide surface of the scale by means of sliding shoes and is seated at the guide surface of the hollow body by means of ball bearings.

6. The measuring apparatus of claim 2 wherein the hollow body is made of metal and the scale is made of glass and is attached to the hollow body with an adhesive.

7. The measuring apparatus of claim 6 wherein the metal is aluminum.

8. The measuring apparatus of claim 1, wherein the spring member is a pre-tensioned wire bow mounted between the first and second coupling parts.

9. The measuring apparatus of claim 1, further comprising an entrainment means coupled to the measured object and wherein the first coupling part is a lever pivotally attached to the entrainment means and the second coupling part is formed on the reading unit.

10. The measuring apparatus of claim 9, wherein the spring member is a pre-tensioned wire bow mounted to the lever and the second coupling part.

11. The measuring apparatus of claim 10, wherein the lever is angular and is pivotally adjustable by an actuating screw provided in the entrainment means.

12. The measuring apparatus of claim 10, wherein the wire bow is triangular and is obliquely mounted.

13. A measuring apparatus comprising:
a measuring scale; and
a reading unit for the measuring scale connected to a measured object by a hinged coupling and to an auxiliary guide means, wherein the hinged coupling is provided with a spherical surface and extends from the area of the measured object and the spherical surface seats at a planar surface of the reading unit under the tension of a spring member.

14. The measuring apparatus of claim 13 wherein the coupling is positioned between the reading unit and an entrainment means mounted at the measured object.

15. The measuring apparatus of claim 14 wherein the coupling includes a lever pivotally positioned at the entrainment means.

16. The measuring apparatus of claim 15 wherein the spring member is a pre-tensioned wire bow embracing the lever and the reading unit in a bracket-like manner in the area of the spherical and planar surfaces.

17. The measuring apparatus of claim 16 wherein the lever is angular, and pivotally adjustable by means of an actuating screw.

18. In an apparatus for measuring or adjusting the relative position of two objects, including a measuring scale and a reading unit for the measuring scale, the improvement comprising:
a coupling means provided with an arcuate surface which contacts a planar surface of the reading unit to couple the reading unit in a hinge-like manner to a measured object and to urge the reading unit against auxiliary guide means.

19. The apparatus of claim 18 wherein the arcuate surface seats at the planar surface under the tension of a spring member.

20. The apparatus of claim 19 wherein the arcuate surface is spherical.

21. The apparatus of claim 19 wherein the coupling is positioned between the reading unit and an entrainment means connected to the measured object.

22. The apparatus of claim 21 wherein the coupling includes a lever pivotably positioned at the entrainment means.

23. The apparatus of claim 22 wherein the spring member is a pre-tensioned wire bow mounted between the lever and the reading unit.

24. The apparatus of claim 23 wherein the lever is angular and pivotally adjustable by means of an actuating screw.

* * * * *

UNITED STATES PATENT AND TRADEMARK OFFICE
CERTIFICATE OF CORRECTION

PATENT NO. : 4,095,903
DATED : 6/20/78
INVENTOR(S) : Feichtinger, Kurt

It is certified that error appears in the above-identified patent and that said Letters Patent are hereby corrected as shown below:

Delete Claims 3 through 7.

On the cover sheet, "24 Claims" should read -- 19 Claims --.

Signed and Sealed this

Thirteenth Day of February 1979

[SEAL]

Attest:

RUTH C. MASON
Attesting Officer

DONALD W. BANNER
Commissioner of Patents and Trademarks